United States Patent
Altan et al.

(10) Patent No.: US 6,813,562 B2
(45) Date of Patent: Nov. 2, 2004

(54) THREAT ASSESSMENT ALGORITHM FOR FORWARD COLLISION WARNING

(75) Inventors: Osman D. Altan, Northville, MI (US); Ronald C. Colgin, Stevenson Ranch, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/272,532

(22) Filed: Oct. 15, 2002

(65) Prior Publication Data

US 2004/0073367 A1 Apr. 15, 2004

(51) Int. Cl.$^7$ .............................................. G06F 17/10
(52) U.S. Cl. ...................................... 701/301; 340/436
(58) Field of Search ..................... 701/301, 96; 342/70, 342/71; 340/436

(56) References Cited

U.S. PATENT DOCUMENTS

| | | | | |
|---|---|---|---|---|
| 5,357,438 A | * | 10/1994 | Davidian | 701/301 |
| 5,471,214 A | * | 11/1995 | Faibish et al. | 342/70 |
| 5,594,414 A | * | 1/1997 | Namngani | 340/436 |
| 5,638,281 A | * | 6/1997 | Wang | 701/301 |
| 5,689,422 A | * | 11/1997 | Heymann et al. | 701/93 |
| 5,754,099 A | * | 5/1998 | Nishimura et al. | 340/435 |
| 5,808,561 A | * | 9/1998 | Kinoshita et al. | 340/903 |
| 5,979,586 A | | 11/1999 | Farmer et al. | 180/274 |
| 6,097,311 A | | 8/2000 | Iwasaki et al. | 340/903 |
| 6,275,180 B1 | | 8/2001 | Dean et al. | 342/70 |
| 6,278,360 B1 | * | 8/2001 | Yanagi | 340/436 |
| 6,326,887 B1 | * | 12/2001 | Winner et al. | 340/435 |
| 6,580,973 B2 | * | 6/2003 | Leivian et al. | 701/1 |
| 6,590,495 B1 | * | 7/2003 | Behbehani | 340/435 |
| 2003/0149545 A1 | * | 8/2003 | Shu et al. | 702/182 |

\* cited by examiner

*Primary Examiner*—Michael J. Zanelli
(74) *Attorney, Agent, or Firm*—Kathryn A. Marra

(57) ABSTRACT

An algorithm for use in a forward looking collision warning system employed in a vehicle. The collision warning system includes a radar device that generates track files of the range and speed of objects in the vehicle's path. The system also includes a collision warning processor running the algorithm that receives the track files and various input data to determine whether an alert of a potential collision should be issued, and if so, to what degree. The input data includes the speed and acceleration of the vehicle, whether the vehicle's brakes are being applied, collision warning sensitivity, driver distraction modifiers, road condition data, such as wiper speed and outside air temperature, etc. is provided. The processor calculates an alert level based on the various inputs, and outputs the alert level to a driver vehicle interface to notify the driver of the potential collision.

36 Claims, 4 Drawing Sheets

THREAT ASSESSMENT ALGORITHM FOR FORWARD COLLISION WARNING

GOVERNMENT RIGHTS

The U.S. Government may have a paid-up license in this invention and limited circumstances to require the patent owner to license others on reasonable terms as provided for by the terms of contract no. DTNH22-99-H07019 awarded by the National Highway Transportation and Safety Administration (NHTSA).

BACKGROUND OF THE INVENTION

1. Field of the Invention

This invention relates generally to a forward collision warning system for a vehicle and, more particularly, to an algorithm for determining a driver alert level for a forward collision radar warning system associated with a vehicle.

2. Discussion of the Related Art

Various types of safety systems are known in the art for protecting the occupants of a vehicle in the event of a collision. Some of these systems attempt to prevent the collision before it occurs. For example, it is known to equip a vehicle with a forward looking collision warning laser or radar system that alerts the driver of a potential collision with objects, such as other vehicles, in the vehicle's path to allow the driver to take corrective measures to prevent the collision. The collision warning system transmits a radar or laser beam forward of the vehicle and processes reflections from objects in the path of the vehicle. The system generates measurements from the reflections and assesses the potential for a collision based on the vehicle speed and direction relative to the objects. The alert can be a visual indication on the vehicle's instrument panel or in a head-up display (HUD), and/or can be an audio warning or other HAPTIC feedback device. Examples of vehicle collision warning systems of this type can be found in U.S. Pat. Nos. 6,275,180; 6,097,311 and 5,979,586.

SUMMARY OF THE INVENTION

In accordance with the teachings of the present invention, an algorithm for use in connection with a forward looking collision warning system employed in a vehicle is disclosed. The collision warning system includes a radar or laser device that generates track files of the range and closing rate of objects in the path of the vehicle. The system also includes a collision warning processor running the algorithm that receives the track files and various input data to determine whether an alert of an impending collision with one or more of the objects should be issued, and if so, to what degree. The input data includes vehicle dynamics inputs, such as the speed and acceleration of the vehicle, whether the vehicle brakes are being applied, the vehicle gear, the vehicle yaw rate, etc. The input data also includes driver inputs, such as collision warning sensitivity, driver distraction modifiers, etc. Additionally, input data for road conditions, such as wiper speed and outside air temperature, is provided to the processor. The processor calculates an alert level based on the various inputs, and outputs the alert level to a driver vehicle interface to notify the driver of a potential collision. The system also determines whether an adaptive cruise control has been activated, and if so, automatically makes vehicle corrections to prevent a collision.

Additional objects, advantages and features of the present invention will become apparent from the following description and appended claims, taken in conjunction with the accompanying drawings.

DETAILED DESCRIPTION OF THE INVENTION

The following discussion of the invention directed to an algorithm for use in a forward collision warning system in a vehicle is merely exemplary in nature, and is in no way intended to limit the invention or its applications or uses.

Figure 1:
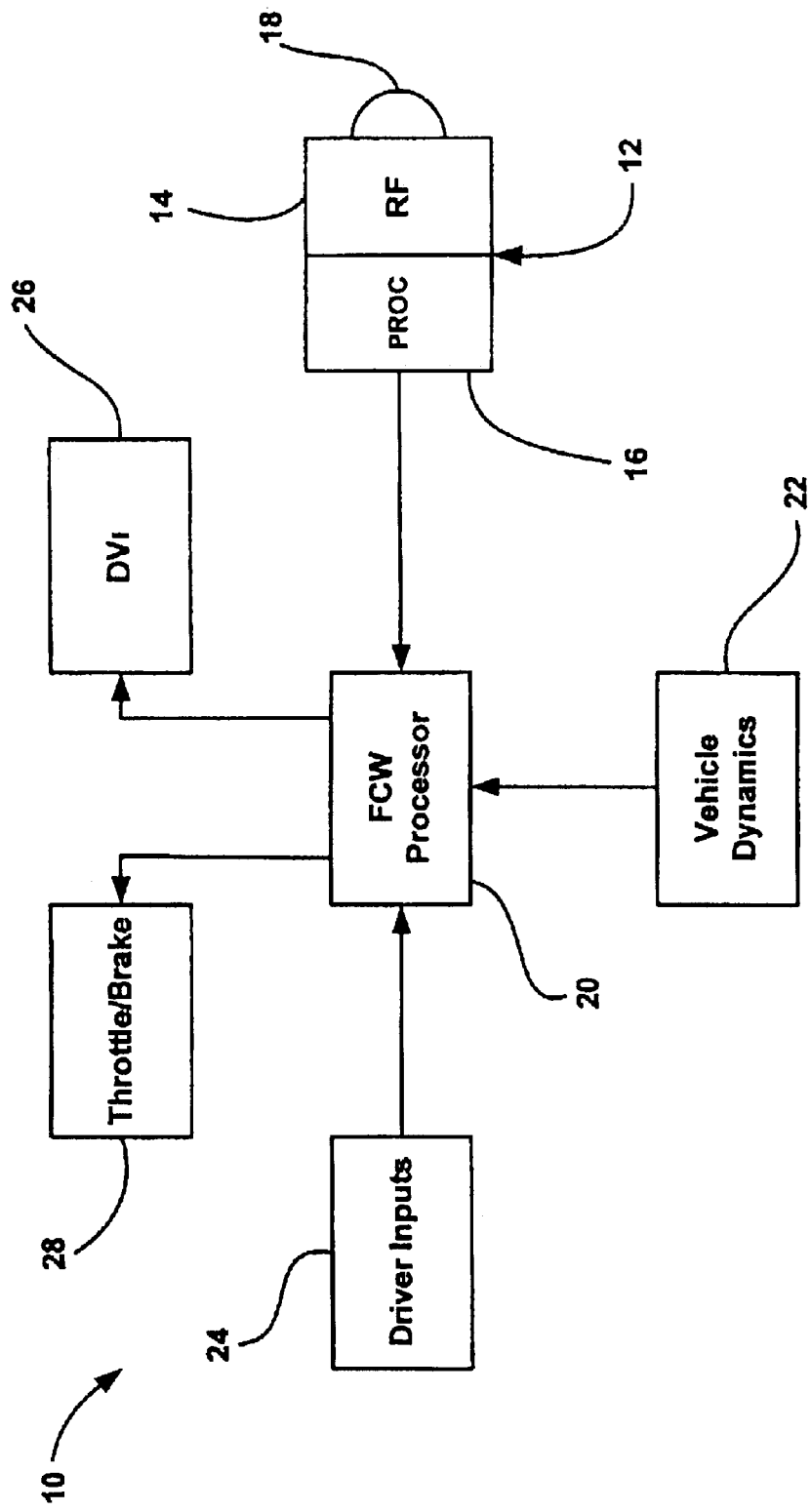
FIG. 1 is a block diagram of a forward collision warning (FCW) radar system, according to an embodiment of the present invention.

FIG. 1 is a block diagram of a forward looking collision warning system 10 employing an algorithm for generating a graduated collision alert in the event of a potential collision, according to an embodiment of the present invention. The system 10 includes a radar device 12 that is mounted at the front of a subject vehicle (not shown) in a suitable location to provide a forward collision warning radar beam pattern suitable for the purposes discussed herein. Although the invention discussed herein employs radar frequencies, it will be appreciated by those skilled in the art that other systems can employ laser sources using laser beams and the like. Therefore, the present invention is not limited to radar. The radar device 12 includes an RF transceiver (or optical transceiver) portion 14 and a processor portion 16. The radar device 12 emits a radar beam from a window 18 at a certain frequency, such as 76 GHz. Reflections of the radar beam from objects in the beam pattern are received by the radar device 12 and processed by the processor 16, in a manner that is well understood by those skilled in the art. The processor 16 generates frames of track files at a relatively low frequency, for example 100 ms, where each track file identifies the distance and speed of objects in a field-of-view defined by the radar beam pattern in front of the subject vehicle. In one embodiment, the radar device 12 tracks up to fifteen separate objects, both moving and stationary. The radar device 12 can be any suitable radar device for the purposes described herein, such as the adaptive cruise control with alert (ACC/A) radar device available from Delphi Corporation, Automotive Systems Division, Inc.

The track files are sent to a forward collision warning (FCW) processor 20 that processes the track files and other input data to determine whether an alert should be given that a collision is probable or imminent at the current vehicle speed and direction so that the driver can take the necessary action, as will be discussed in more detail below. The processor 20 can be any processor suitable for the purposes described herein, such as the PC104 available from Real Time Devices USA, Inc. of State College, Pa. As will be discussed below, the processor 20 receives the range R between the subject vehicle and the objects in the field-of-view from the processor 16, and determines the predicted acceleration $a_f$ of the subject vehicle based on the current parameters, the velocity $V_L$ of the objects in the field-of-view, and the predicted acceleration $a_L$ of the objects in the field-of-view.

The processor 20 determines whether an alert should be given based on the combination of the track files and various input data identifying current relevant conditions. Some of the input data comes from vehicle dynamics 22, and can include the subject vehicle speed $V_f$, the subject vehicle actual acceleration $a_a$, the gear the subject vehicle is in (PRNDL), the direction the subject vehicle is being steered, the yaw rate of the subject vehicle, whether the subject vehicle is being braked, traction control activation, abs activation, road friction, etc. Other vehicle dynamics input data can also be provided to the processor 20 within the scope of the present invention. Further, the processor 20 receives driver inputs 24, including a sensitivity setting of the system 10 set by the driver, windshield wiper activation, outside air temperature, vehicle HVAC operation, radio operation, electric seat operation, electric mirror operation, etc. The driver sensitivity is based on a manual setting provided by the driver that selects if the driver wants the system to behave aggressively or conservatively. In one embodiment, the selection includes six settings (1–6), and can be located on the steering wheel of the vehicle. As will be apparent from the discussion below, some of the input information is to determine the driver's level of distraction and some of the input information is outside environmental conditions so that the sensitivity of the alert can be modified accordingly. As will be appreciated by those skilled in the art, other driver distraction and environmental information can also be provided to the processor 20 within the scope of the present invention.

The processor 20 provides an alert level output if a collision is probable or imminent at the current vehicle speed and direction to a driver vehicle interface (DVI) 26. In one embodiment, the DVI 26 is provided in a head-up display (HUD) projected on the windshield of the vehicle, and includes a series of visual warning levels between 0 and 100 of the degree of the probable collision. Further, the DVI 26 can include an audio signal, such as a buzzer, when the alert reaches the maximum collision level. It will be appreciated that vibrational or other alert devices could be used. If an adaptive cruise control (ACC) of the vehicle has been activated, then the system 10 automatically applies the throttle or brake to the vehicle by a system 28 to avoid the collision and also issues an audio/visual alert, if needed.

Figure 2A:
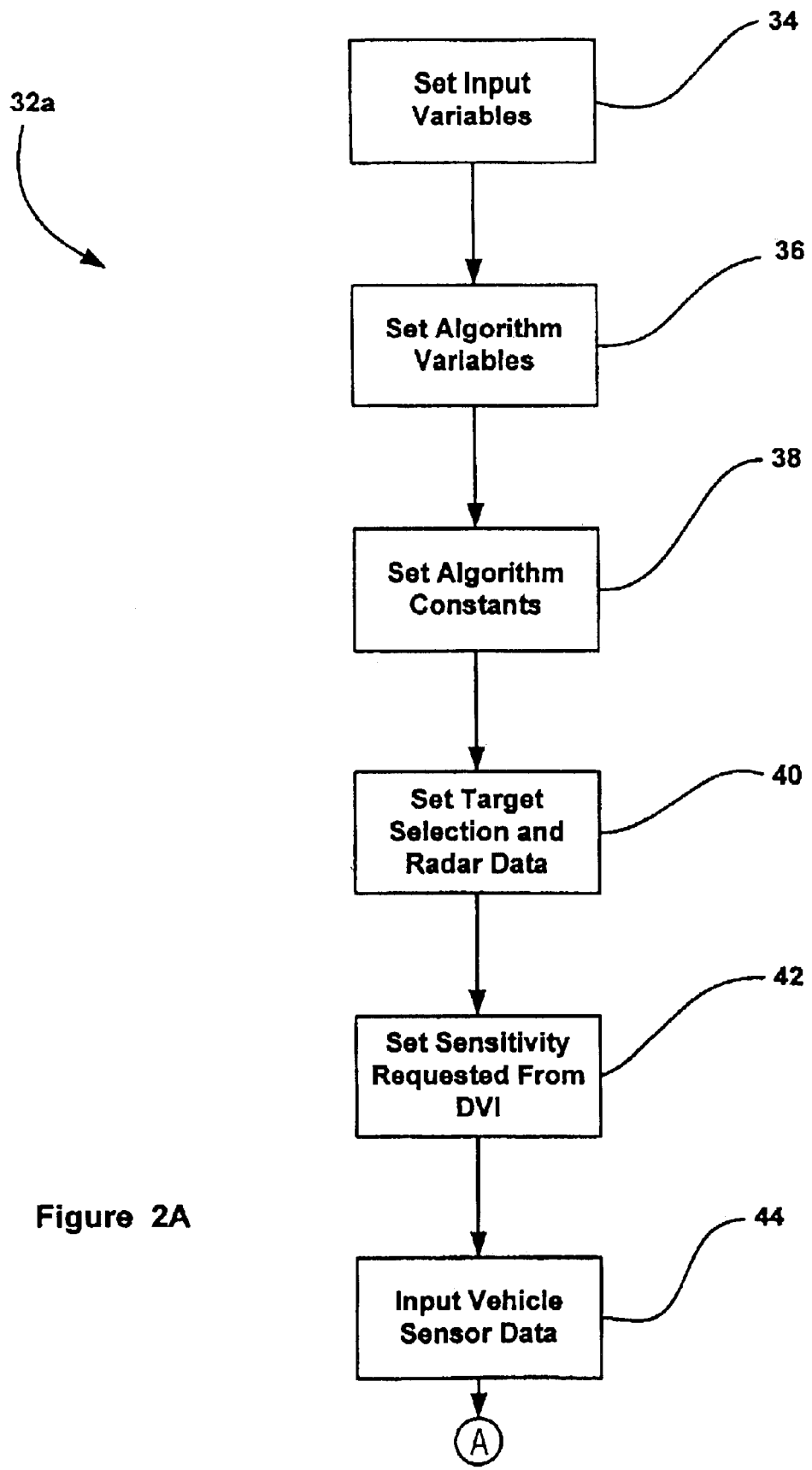
FIGS. 2A–2C show a flow chart diagram for an algorithm for controlling the FCW system shown in FIG. 1.
Figure 2B:
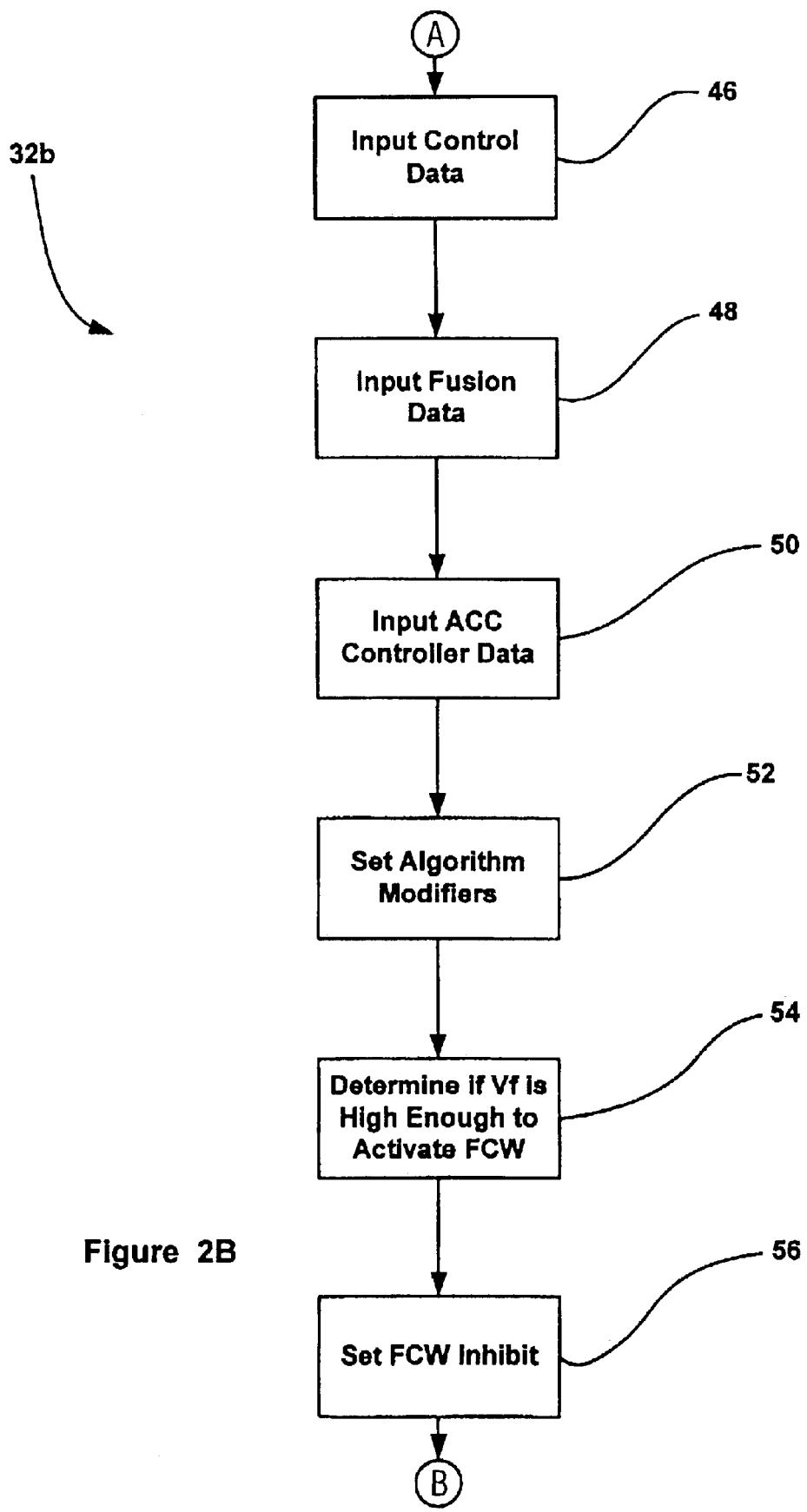
Figure 2C:
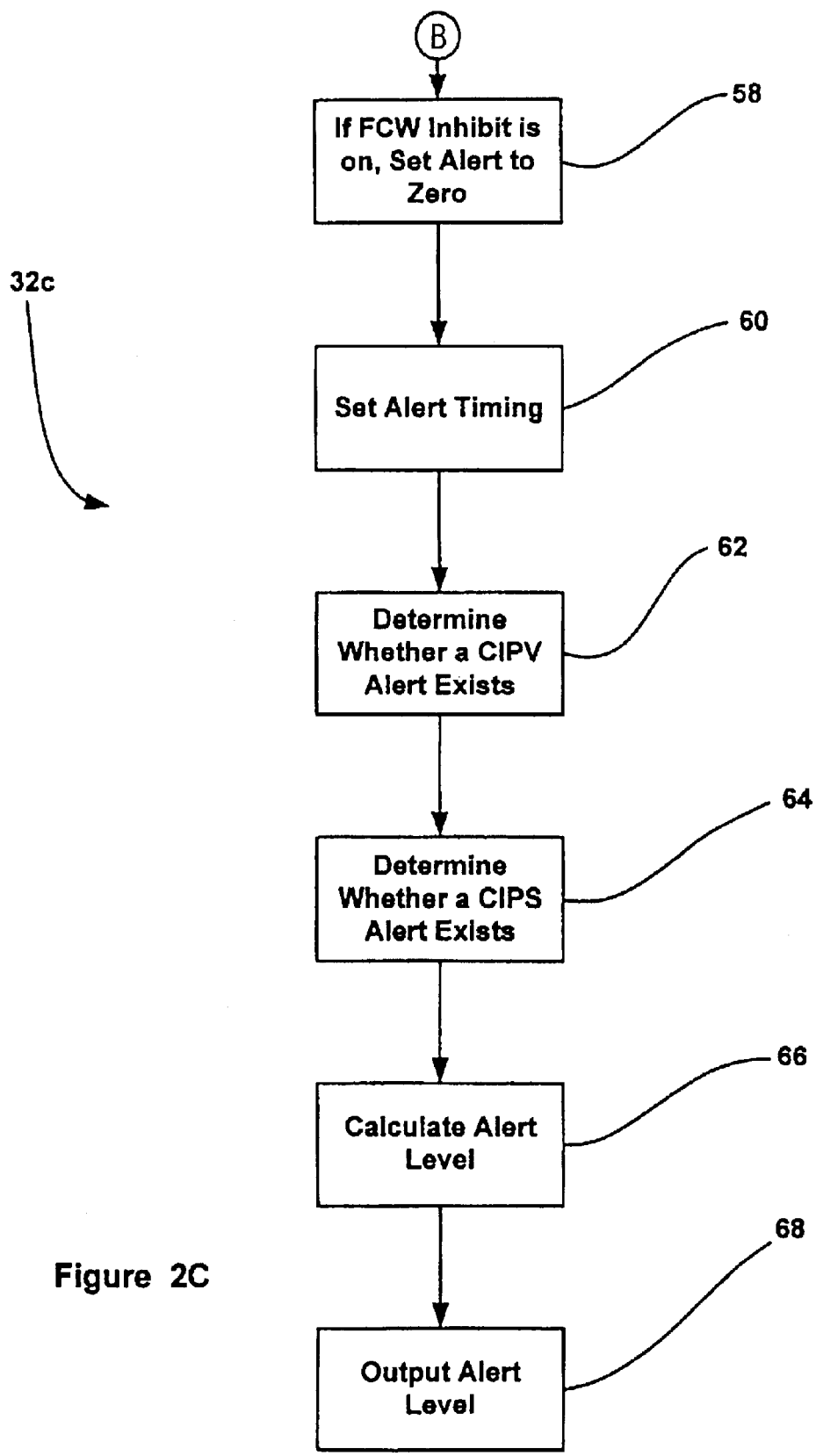

FIGS. 2A–2C show a flow chart diagram depicting the steps of an algorithm 32 for providing a graduated alert to the DVI 26, according to an embodiment of the invention. For each frame of the track files, the algorithm 32 generates the various variables and constants that will be used to determine if the alert should be issued, and if so, to what level. It is stressed that the various numerical parameters and the like given below and used by the algorithm 32 are by way of non-limiting examples in that other values and parameters can be employed for other applications within the scope of the present invention. The step at box 34 sets various input variables of the algorithm 32. As mentioned above, the input variables include driver distraction variables, such as whether the driver is changing the radio settings, adjusting the vehicle HVAC, etc. Further, the input variables include the sensitivity that the driver selects for the system 10. The input variables also include whether the radar device 12 and the processor 16 are operating properly. In some applications, dirt or ice may accumulate on the window 18, causing the radar device 12 to be inoperable. Further, functional tests in the processors 16 and 20 may determine that something is not operating correctly. If a fault is detected, the system 10 will provide an indication of system failure.

The input variables also include the identification and state of previously detected moving and stationary objects, as well as newly detected moving and stationary objects. The algorithm 32 determines the closest in path vehicle (CIPV) for the closest moving object, and whether it is a newly detected moving object or an object that has been tracked in previous frames. The algorithm 32 determines the number of times the CIPV was previously detected, and the predicted acceleration $a_L$ of the CIPV. Further, the algorithm 32 receives the closest in path stationary (CIPS) object and the range of the CIPS, and determines the acceleration of the CIPS, which should be zero.

The input variables also include whether the driver has activated the brakes of the subject vehicle to allow the algorithm 32 to make a determination that the driver does recognize a potential collision with an object in front of the vehicle and has taken the necessary actions. Further, other input variables that are set by the algorithm 32 include whether the vehicle wipers have been activated to determine whether the road is wet, and an outside air temperature reading to determine whether the road may be slippery because of ice and the like. Suitable vehicle sensors are provided for determining brake activation, windshield wiper activation, vehicle speed, vehicle acceleration, etc. Other input variables include the subject vehicle speed $V_f$ and the subject vehicle acceleration $a_a$. The algorithm 32 also determines whether the adaptive cruise control (ACC) has been set by the driver, so that the algorithm 32 can set the automatic braking.

The algorithm 32 then sets algorithm variables at box 36. The algorithm variables include the subject vehicle velocity $V_f$ in meters/second (m/s), the velocity $V_L$ of the detected objects in front of the subject vehicle in m/s, the predicted accelerations $a_f$ of the subject vehicle in m/s/s, the predicted acceleration $a_L$ of the detected objects in m/s/s, a delay time T in seconds, and the range R in meters to the detected objects present in the track files. Further, the algorithm 32 initializes the various parameters to zero, including the alerts and the predicted accelerations.

The next step of the algorithm 32 includes setting the algorithm constants, as indicated at box 38. The algorithm constants include setting a minimum threshold as to how quickly the subject vehicle has to be gaining on the CIPV or the CIPS in order for an alert to issue. In one embodiment, the minimum threshold for both stopped objects and moving objects is five miles per hour, where the algorithm 32 determines that the object is stopped if it is traveling at five miles per hour or less. Further, the algorithm 32 sets a braking constant for the moving objects of 0.2 g as an assumption to measure the predicted acceleration $a_L$ of the moving objects in the track files. In other words, the algorithm 32 assumes that the CIPV is breaking at 0.2 g as a worse case scenario to calculate the alert level.

Further, the algorithm 32 makes a determination as to whether the subject vehicle is overtaking (passing) the CIPV. The algorithm 32 does this by setting an overtaking threshold, 0.1 g in one embodiment, in that if the subject vehicle is accelerating at this speed or greater, then no alert or a reduced alert is given for a potential impending collision because it is assumed that the driver is passing the CIPV. The algorithm 32 also sets an acceleration measurement tolerance of 0.2 m/s/s. The algorithm 32 also sets an upper speed limit and a lower speed limit defining what vehicle speed the system 10 will be activated and then deactivated. In one embodiment, the system 10 is not activated until the vehicle speed $V_f$ goes above 25 mph (11.2 m/s) and is not deactivated until the vehicle speed $V_f$ drops below 20 mph (8.9 m/s). The algorithm 32 also sets the highest alert level before the audio signal is given. In one embodiment, the highest alert level is 98 out of 100 levels above which the audio signal is given of a potential collision to the DVI 26.

The algorithm 32 also sets a subject vehicle delay time, which is 1.6 seconds in one embodiment. The algorithm 32 also sets a threshold for using radar reported acceleration, which is −0.35 g in one embodiment. The algorithm 32 also sets a range cut-off $R_{co}$ as a minimum range between the subject vehicle and the CIPV and CIPS before an alert is given. In one embodiment, if the detected object is moving, the range cut-off $R_{co}$ is 100 m and if the detected object is stationary, the range cut-off $R_{co}$ is 80 m. The algorithm 32 also sets a minimum number of frames in which a stationary object has to be detected for it to be a valid target. In one embodiment, the algorithm 32 must detect the stationary object in two consecutive frames.

After the various algorithm constants are set, the algorithm 32 then sets target selection and radar data, as indicated at box 40. As mentioned above, the system 10 only detects from one to fifteen moving and stationary objects. Further, the track files from the processor 16 identify a stationary or moving object in different ways for the number of consecutive frames the moving and stationary objects are detected. In one embodiment, the processor 16 determines an invalid track, a new track, a mature track, a coasted track, a merged track and a killed track based on the number of frames where the object is detected.

The algorithm 32 then sets the sensitivity of the DVI 26 based on the driver selected sensitivity setting, as indicated at box 42.

The algorithm 32 is now set to determine whether the various inputs indicate whether an alert should be issued. The algorithm 32 inputs vehicle sensor data at box 44 to make the various calculations to determine whether the alert should be issued. The sensor data includes the various inputs discussed above, such as the subject vehicle speed $V_f$, whether the driver is braking, the subject vehicle acceleration $a_a$, outside air temperature, whether the wipers have been activated, and if so, what speed, etc.

The algorithm 32 then inputs control data at box 46 that includes whether the processor 20 and the radar device 12 are operating properly.

The algorithm 32 then determines input fusion data at box 48. The fusion data is the determination of whether there is a driver distraction from activating the radio, HVAC, etc., as discussed above. In one embodiment, the algorithm 32 has four levels of distraction, including zero for no distraction, one for low distraction, two for moderate distraction, and three for high distraction.

The algorithm 32 then determines whether the driver has activated the automatic cruise control (ACC) at box 50. If the automatic cruise control is activated, then the throttle and brake control provided by the processor 20 is actuated accordingly.

The algorithm 32 then sets a modified value gamma based on the algorithm modifiers at box 52. The algorithm modifiers include determining the outside air temperature, determining whether the wipers have been activated and if so, at what speed, etc. The modifier value is set higher as the outside air temperature drops, especially below freezing, and/or the wiper speed increases. The higher the modifier value, the more the algorithm 32 is adjusted to consider such affects, in combination with the range R and/or the speed of the CIPV, to determine if the alert will be issued. The algorithm 32 sets the value gamma that defines the combination of the driver sensitivity, driver distraction and the algorithm modifiers.

The algorithm 32 then determines if the vehicle speed $V_f$ is high enough to activate the system 10 at box 54. As discussed above, in one embodiment, the subject vehicle must be going faster than 25 mph before the system is activated, and then must slow down below 20 mph to deactivate the system.

The algorithm 32 then determines whether the system 10 is operating properly, at box 56. If the processor 20 detects a processor fault, or detects inoperability of the radar device 12, or detects that the driver has activated the brake, in combination with the vehicle speed $V_f$, then an FCW inhibit is set to one, deactivating the system 10. If the FCW inhibit is set to zero, where the system 10 is activated, then the algorithm 32 sets the alert level to zero, as indicated at box 58.

After all of the data is processed, the algorithm 32 then sets the alert timing, as indicated at box 60. The alert timing is a delay time T that is based on the driver sensitivity (1–6) as set by the driver. The delay time T is modified by the driver distraction at the box 48 and the algorithm modifiers at the box 52.

The algorithm 32 then determines whether an alert should be issued for a moving object, such as the CIPV, at box 62. If the ACC is activated and a moving object is detected within the range $R_{ca}$, as modified by the parameters discussed above, then the algorithm 32 issues a full alert (100) to the DVI 26. If the ACC is not enabled, then the algorithm 32 determines whether an alert should be given for a detected moving object in front of the subject vehicle, and if so, at what level. In other words, based on the range R, the speeds of the subject vehicle and the detected object, the predicted acceleration of the subject vehicle, the detected moving object, and the modifiers discussed above, the alert level (0–100) is calculated.

The algorithm 32 calculates the predicted acceleration $a_f$ of the subject vehicle based on the current acceleration $a_a$ of the subject vehicle, the current speed $V_f$ of the subject vehicle, the speed $V_L$ of the detected moving object, and the predicted acceleration $a_L$ of the detected object for the current conditions. Any suitable sub-routine can be used to calculate the predicted acceleration $a_f$ based these parameters. A collision avoidance range $R_{ca}$ is calculated based on the input information that is the range which determines whether a maximum alert is given for the current conditions. If the algorithm 32 determines that the range R is less than or equal to the collision avoidance range $R_{ca}$, then a full alert will be issued (100 visual signal and an audio signal). If the algorithm 32 determines the detected object is moving away from the subject vehicle, then the alert is set to zero. If the range R is greater than the range cut-off $R_{co}$ (100 m), then the alert is also set to zero.

If the algorithm 32 determines that the range R is greater than $R_{ca}$ but less than the range cut-off $R_{co}$, then it will set the alert level corresponding to that distance for the current conditions. To determine the visual alert level between zero and 100, the algorithm 32 calculates a range $R_1$ and a range $R_2$ which are greater than collision avoidance range $R_{ca}$, but less than the range cut-off $R_{co}$. In one embodiment, $R_1 = R_{ca} + (V_f - V_L)\tau$ and $R_2 = V_f T$. If $R > R_{ca}$ and $R \leq (R_{ca} + R_1)/2$, then the alert level is set to 75. If $R > (R_{ca} + R_1)/2$ and $R \leq R_1$, then the alert level is set to 25.

If the algorithm 32 determines that the subject vehicle is attempting to overtake the detected moving object, then it sets the visual signal to its highest level without issuing the audio signal. Also, the algorithm 32 determines whether the detected moving object is a coasting target that has been dropped by the radar device 12 where the algorithm 32 gives a high visual alert without the audio alert.

The algorithm 32 then determines the alert level for a detected stationary object, such as the CIPS, as indicated at box 64, in the same manner as it did for the detected moving object with the appropriate input variables for stationary objects. The algorithm 32 then calculates the alert level at box 66 which is the highest alert between the moving object and the stationary object. The alert level is then output to the DVI 26 at box 68.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method of indicating a potential collision between a subject vehicle and at least one detected object, comprising:
   transmitting a beam from a beam device into a field-of-view;
   receiving reflections of the beam at the beam device from an object in the field-of-view;
   generating track files based on the reflections that include the distance the object is from the vehicle;
   processing an alert condition in a collision processor based on the track files and other system inputs, wherein the other system inputs include the speed of the subject vehicle and one or more of a driver distraction modifier, a system fault modifier and a driver sensitivity modifier, and wherein processing an alert condition includes calculating a predicted acceleration of the subject vehicle based on the current acceleration of the subject vehicle, the current speed of the subject vehicle, the speed of the object and a predicted acceleration the object; and
   alerting a driver of the subject vehicle in the event that a potential collision with the object is determined.

2. The method according to claim 1 wherein the driver distraction modifier includes whether the driver is activating a vehicle radio and/or a vehicle heating and cooling system.

3. The method according to claim 1 wherein the driver sensitivity modifier determines the aggressiveness or conservativenes of issuing the alert from a manual input by the driver.

4. The method according to claim 1 wherein the system fault modifier provides a determination as to whether the collision processor and/or the beam device are operating correctly.

5. The method according to claim 1 wherein the system inputs include an outside air temperature and whether vehicle windshield wipers have been activated.

6. The method according to claim 1 wherein the system inputs include whether the subject vehicle is being braked.

7. The method according to claim 1 wherein the collision processor gives an alert level between a minimum level of zero and a maximum level of 100.

8. The method according to claim 1 wherein the collision processor provides a visual signal if the alert is below a maximum level and an audio signal if the alert is at a maximum level.

9. The method according to claim 1 further comprising preventing the alert from being given until the vehicle is traveling above a first predetermined vehicle speed, and preventing the alert from being given if the vehicle speed drops below a second predetermined vehicle speed.

10. The method according to claim 9 wherein the first predetermined vehicle speed is 25 miles per hour and the second per determined vehicle speed is 20 miles per hour.

11. The method according to claim 1 wherein the processor prevents the alert from being given if the processor determines that the vehicle is overtaking the object.

12. The method according to claim 1 further comprising determining whether an adaptive cruise control is activated.

13. The method according to claim 1 wherein the beam is selected from the group consisting of radar beams and optical beams and the beam device is selected from the group consisting of radar devices and optical devices.

14. A method of providing an alert indicating a potential collision between a subject vehicle and one or more moving or stationary objects, comprising:
   transmitting a radar beam from a radar device into a field-of view;
   receiving reflections of the radar beam at the radar device from an object in the field-of-view;
   generating track files based on the reflections that include the relative speed of the object and the distance the object is from the subject vehicle;
   processing an alert condition in a forward warning collision processor based on the track files and other system inputs, wherein the other system inputs include the speed of the subject vehicle, a driver distraction modifier, a system fault modifier, a driver sensitivity modifier, an outside environment modifier, wherein processing the alert condition includes determining whether the alert should be issued, and wherein processing an alert condition further includes calculating a predicted acceleration of the subject vehicle based on the current speed of the subject vehicle, the current acceleration of the subject vehicle, the speed of the object and a predicted acceleration of the object; and
   generating the alert in the event that the collision process determines that there is a potential collision with the object.

15. The method according to claim 14 wherein the driver distraction modifier includes whether the driver is activating a vehicle radio and/or a vehicle heating and cooling system.

16. The method according to claim 14 wherein the driver sensitivity modifier determines the aggressiveness or conservativeness of issuing the alert from a manual input by the driver.

17. The method according to claim 14 wherein the system fault modifier provides a determination as to whether the collision processor and/or the radar device are operating correctly.

18. The method according to claim 14 wherein the system inputs include an outside air temperature and whether vehicle windshield wipers have been activated.

19. The method according to claim 14 wherein the collision processor determines an alert level between a minimum level of zero and a maximum level of 100.

20. The method according to claim 14 further comprising preventing the alert from being given until the vehicle is traveling above a first predetermined vehicle speed, and preventing the alert from being given if the vehicle speed drops below a second predetermined vehicle speed.

21. The method according to claim 14 wherein the processor prevents the a lert from being given if the processor determines that the vehicle is overtaking the object.

22. The method according to claim 14 further comprising determining whether an adaptive cruise control is activated.

23. A method of providing an alert indicating a potential collision between a subject vehicle and one or more moving or stationary objects, comprising:
   transmitting a radar beam from a radar device to a field-of-view;
   receiving reflections of the radar beam at the radar device from an object in the field-of-view;

generating track files based on reflections that include the relative speed of the object and the distance the object is from the subject vehicle;

processing an alert condition in a forward warning collision processor based on the track files and other system inputs, wherein the other system inputs include the speed of the subject vehicle, a driver distraction modifier, a system fault modifier, a driver sensitivity modifier, an outside environment modifier, a predicted acceleration of the subject vehicle and a predicted acceleration o the object, wherein the driver sensitivity modifier determines aggressiveness or conservativeness from a manual input by the driver and the system fault modifier provides a determination as to whether the collision processor and/or the radar device are operating correctly, wherein the predicted acceleration of the subject vehicle is based on the current speed of the subject vehicle, the current acceleration of the subject vehicle, the speed of the object and the predicted acceleration of the object, and wherein processing the alert condition includes determining whether the alert should be issued; and generating the alert in the event that the collision processor determines that there is a potential collision with the object.

24. A collision warning system for providing an alert signal indicating a potential collision between a subject vehicle and an object in the path of the vehicle, said system comprising:

a beam device, said beam device transmitting a beam into a field-of-view and receiving reflections of the beam from objects in the field-of-view, said beam device generating track files based on the reflections that include the relative speed of the object and the distance of the object from the subject vehicle;

a collision processor, said collision processor being responsive to the track files and system inputs, said collision processor determining whether the alert signal should be issued based on the track files and other system inputs, said other system inputs including one or more of a driver distraction modifier, a system fault modifier and a driver sensitivity modifier, said collision processor calculating a predicted acceleration of the subject vehicle based on the current speed of the subject vehicle, the current acceleration of the subject vehicle, the speed of the object and a predicted acceleration of the object; and a vehicle interface responsive to the alert signal from the collision processor, said vehicle interface providing an indication to a driver the subject vehicle that a collision is possible.

25. The system according to claim 24 wherein the driver distraction modifier includes whether the driver is activating a vehicle radio and/or a vehicle heating and cooling system.

26. The system according to claim 24 wherein the driver sensitivity modifier sets the aggressiveness or conservativeness of issuing the alert signal.

27. The system according to claim 24 wherein the system fault modifier provides a determination as to whether the collision processor and/or the beam device are operating correctly.

28. The system according to claim 24 wherein the system inputs include a determination of an outside air temperature and whether vehicle windshield wipers have been activated.

29. The system according to claim 24 wherein the system inputs include whether the subject vehicle is being braked.

30. The system according to claim 24 wherein the collision processor provides a visual signal if the alert signal is below a maximum level and a audio signal if the alert signal is at the maximum level.

31. The system according to claim 24 wherein the collision processor prevents the alert signal from being issued until the vehicle is traveling above a first predetermined vehicle speed, and prevents the alert signal from being issued if the vehicle speed drops below a second predetermined vehicle speed.

32. The system according to claim 24 wherein the processor prevents the alert signal from being given if the processor determines that the vehicle is overtaking the object.

33. The system according to claim 24 wherein the processor determines whether an adaptive cruise control is activated.

34. The system according to claim 24 wherein the beam device is selected from the group consisting of radar devices and optical devices and the beam is selected from the group consisting of radar beams and optical beams.

35. A method of indicating a potential collision between a subject vehicle and at least one detected object, comprising:

transmitting a beam from a beam device into a field-of-view;

receiving reflections of the beam at the beam device from an object in the field-of-view;

generating track files based on the reflections that include the distance the object is from the vehicle;

processing an alert condition in a collision processor based on the track files and other system inputs, wherein the other system input include the speed of the subject vehicle and one or more of a driver distraction modifier, a system fault modifier and a driver sensitivity modifier;

alerting a driver of the subject vehicle in the event that a potential collision with the object is determined; and preventing the alert from being given until the vehicle is traveling above a first predetermined vehicle speed, and preventing the alert from being given if the vehicle drops below a second predetermined vehicle speed.

36. A collision warning system for providing an alert signal indicating a potential collision between a subject vehicle and an object in the path of the vehicle, said system comprising:

a beam device, said beam device transmitting a beam into a field-of-view and receiving reflections of the beam from objects in the field-of-view, said beam device generating track files based on the reflections that include the relative speed of the object and the distance of the object from the subject vehicle;

a collision processor, said collision processor being responsive to the track files and system inputs, said collision processor determining whether the alert signal should be issued based on the track files and other system inputs, said system inputs including one or more of a driver distraction modifier, a system fault modifier and a driver sensitivity modifier, wherein the collision processor prevents the alert signal from being issued until the vehicle is traveling above a first predetermined vehicle speed, and prevents the alert signal from being issued if the vehicle speed drops below a second predetermined vehicle speed; and a vehicle interface responsive to the alert signal from the collision processor, said vehicle interface providing an indication to a driver the subject vehicle that a collision is possible.

* * * * *